US011985471B2

(12) United States Patent
Kajimura

(10) Patent No.: US 11,985,471 B2
(45) Date of Patent: May 14, 2024

(54) COMMUNICATION APPARATUS CAPABLE OF COMMUNICATING WITH EXTERNAL REPRODUCTION DEVICE, METHOD OF CONTROLLING SAME, AND STORAGE MEDIUM

(71) Applicant: CANON KABUSHIKI KAISHA, Tokyo (JP)

(72) Inventor: Fumihiro Kajimura, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 199 days.

(21) Appl. No.: 17/852,733

(22) Filed: Jun. 29, 2022

(65) Prior Publication Data

US 2023/0011593 A1 Jan. 12, 2023

(30) Foreign Application Priority Data

Jul. 6, 2021 (JP) ................................ 2021-112304

(51) Int. Cl.
*H04R 5/00* (2006.01)
*H04R 1/10* (2006.01)

(52) U.S. Cl.
CPC ....... *H04R 1/1041* (2013.01); *H04R 2420/07* (2013.01)

(58) Field of Classification Search
CPC .................................................. H04R 1/1041
See application file for complete search history.

(56) References Cited

U.S. PATENT DOCUMENTS

2014/0254818 A1* 9/2014 Tse ....................... H04R 1/1041 381/74
2019/0037173 A1* 1/2019 Lee ..................... G06F 3/04842
2020/0296178 A1* 9/2020 Coyle-Gilchrist ........................... H04M 1/72412
2022/0148608 A1* 5/2022 Wang ...................... H04W 4/80

FOREIGN PATENT DOCUMENTS

JP 2016-181869 A 10/2016

* cited by examiner

*Primary Examiner* — Simon King
(74) *Attorney, Agent, or Firm* — Cowan, Liebowitz & Latman, P.C.

(57) ABSTRACT

A communication apparatus capable of easily switching communication between the communication apparatus and an external reproduction device. A communication section performs wireless communication with an earphone that is capable of automatically switching audio data transmitted from a plurality of communication apparatuses including the communication apparatus and reproducing the audio data. A state detection section detects whether or not the communication apparatus is used by a user. In a state in which the communication apparatus has not been used, when it is detected that the communication apparatus is used, the communication unit transmits a reproduction switching signal for switching the earphone to a state for reproducing audio data transmitted from the communication apparatus to the earphone before transmitting the audio data.

14 Claims, 10 Drawing Sheets

COMMUNICATION APPARATUS CAPABLE OF COMMUNICATING WITH EXTERNAL REPRODUCTION DEVICE, METHOD OF CONTROLLING SAME, AND STORAGE MEDIUM

BACKGROUND OF THE INVENTION

Field of the Invention

The present invention relates to a communication apparatus that is capable of communicating with an external reproduction device, a method of controlling the same, and a storage medium.

Description of the Related Art

Most of general digital cameras each incorporate a speaker. Electronic sound is output from the speaker, including notification sound for notifying a user of an operation of the digital camera, such as an electronic shutter sound, and operation sound generated when a release button is pressed for operation. With such electronic sound, a photographer and people around the photographer can grasp a use state (operation state) of the digital camera. However, for example, in a concert held under a quiet environment and a sport scene, electronic sound sometimes prevents not only an artist or a player who is to be photographed from concentrating on his/her performance, but also audience from enjoying the performance.

To prevent occurrence of such trouble, the digital camera can be set to a silent mode in which the output of electronic sound from the speaker is prevented. This makes it possible to prevent a person as the object to be photographed and like other person from being annoyed. On the other hand, a photographer can hear the electronic sound by using an earphone or headphone electrically connected to the digital camera even in the silent mode. In recent years, a wireless earphone has come to be used which can be wirelessly connected to a communication apparatus. The wireless earphone can reduce the inconvenience that a cable included in a conventional wired earphone forms an obstruction (hindrance) to a user operation of the communication apparatus. Further, in some cases, two communication apparatuses are used in combination. In such cases, when hearing the electronic sound using a wireless earphone, the user is required to switch connection of the wireless earphone to a desired one of the two communication apparatuses from which the user desires to hear the electronic sound. For example, Japanese Laid-Open Patent Publication (Kokai) No. 2016-181869 describes a reproduction device which can be connected to two mobile terminals. This publication discloses that when a user reproduces audio data (contents) using the reproduction device, the reproduction device transmits a reproduction request to one of the two mobile terminals according to the audio data selected by the user.

However, the reproduction device described in Japanese Laid-Open Patent Publication (Kokai) No. 2016-181869 requires the user to manually switch reproduction of contents, and hence it takes time to switch reproduction of the contents.

SUMMARY OF THE INVENTION

The present invention provides a communication apparatus that is capable of easily switching communication to an external reproduction device, a method of controlling the communication apparatus, and a storage medium.

In a first aspect of the present invention, there is provided a communication apparatus including a communication unit configured to perform wireless communication with an external reproduction device that is capable of automatically switching audio data transmitted from a plurality of communication apparatuses including the communication apparatus and reproducing the audio data, and a detection unit configured to detect whether or not the communication apparatus is used by a user, wherein the communication unit transmits, in a state having been not used by the user, in response to detection by the detection unit that the communication apparatus is used, predetermined data for switching the external reproduction device to a state for reproducing audio data transmitted from the communication apparatus, to the external reproduction device, before transmitting the audio data.

In a second aspect of the present invention, there is provided a method of controlling a communication apparatus, including performing wireless communication with an external reproduction device that is capable of automatically switching audio data transmitted from a plurality of communication apparatuses including the communication apparatus and reproducing the audio data, detecting whether or not the communication apparatus is used by a user, and transmitting, in a state having been not used by the user, in response to detection by said detecting that the communication apparatus is used, predetermined data for switching the external reproduction device to a state for reproducing audio data transmitted from the communication apparatus, to the external reproduction device, before transmitting the audio data.

According to the present invention, it is possible to easily switch communication between the communication apparatus and the external reproduction device.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

The component elements described in the following embodiments are described only by way of example and are by no means intended to limit the scope of the present invention to them alone. Further, in the embodiments, a case will be described, by way of example, where a communication apparatus is applied to a camera (digital camera) which is an image capturing apparatus, and an external reproduction device is applied to an earphone (headphone).

A first embodiment will be described below with reference to FIGS. 1 to 6. A communication system 100 includes a camera 1 shown in FIG. 1 and an earphone 3 shown in FIG. 2. The camera 1 is an image capturing apparatus capable of photographing an image in a state having an interchangeable lens 2 attached thereto, in short, a digital camera.

Figure 1:
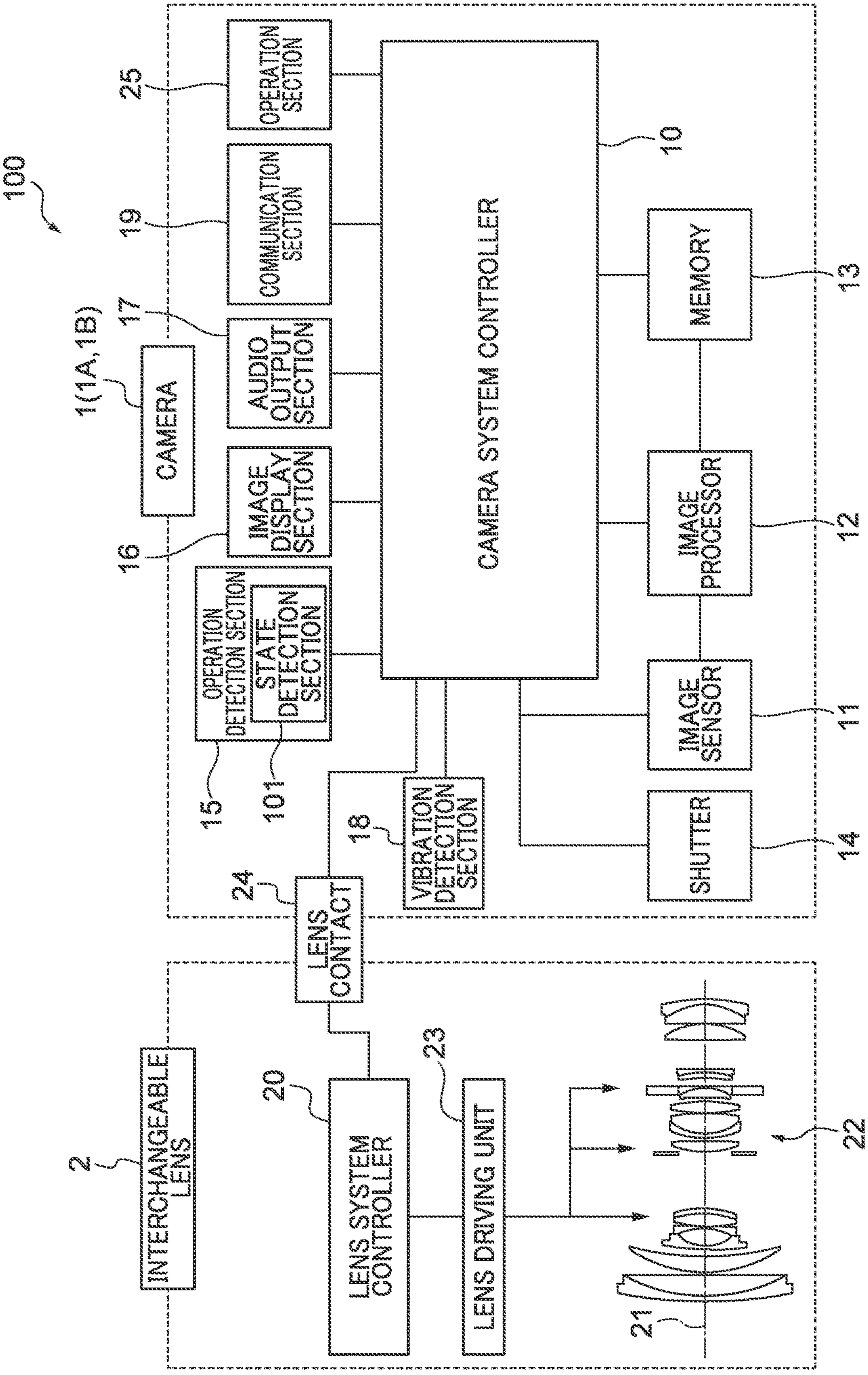
FIG. 1 is a block diagram of a camera as a communication apparatus according to a first embodiment.

As shown in FIG. 1, the camera 1 includes an image sensor 11, an image processor 12, a memory 13, and a focal plane shutter (hereinafter simply referred to as the "shutter") 14. Further, the camera 1 includes an operation detection section 15, an image display section 16, an audio output section 17, a vibration detection section 18, a communication section (communication unit) 19, an operation section (operation unit) 25, and a camera system controller 10.

The image sensor 11 is an element that receives light rays incident through the interchangeable lens 2, and is implemented e.g. by a CCD or CMOS sensor. The image processor 12 includes, for example, a white balance circuit, a gamma correction circuit, an interpolation calculation circuit, and so forth, and generates an image based on information obtained by photoelectric conversion performed by the image sensor 11.

The memory 13 stores information, such as an image generated by the image processor 12. Further, the memory 13 stores programs for causing the camera system controller 10 implemented by a computer to operate the components and units of the camera 1 (for executing the method of controlling the camera 1). The shutter 14 controls blocking and passing of light rays from and through the image sensor 11. The image display section 16 is configured to display image information, photographing information, the status of the camera 1, and so forth, and is implemented e.g. by a liquid crystal.

The audio output section 17 is a speaker that generates electronic sound. Examples of the electronic sound include, for example, focus sound for notifying (informing) a user, when a release button is half-pressed, that the camera has focused on an object (hereinafter referred to as the in-focus state), and electronic shutter sound for notifying (informing) a user, when a release button is fully pressed, that photographing is performed. Further, the electronic sound may be sound of music data or sound of voice data, such as a warning message. Thus, in the present embodiment, the electronic sound is described as sound in an audible range. Note that the "audible range" generally refers to a frequency band of 20 Hz to 16000 Hz. Further, the electronic sound is stored in the memory 13, as audio data. The vibration detection section 18 detects a vibration including e.g. a shake of the camera 1.

The operation section 25 is a part that is capable of receiving a user operation and causing the camera 1 to perform at least two operations which are different in type. In the present embodiment, the operation section 25 is a release button that performs an autofocus operation (hereinafter referred to as the "AF operation") when half-pressed and performs a release operation when fully pressed. The AF operation is a photographing preparation operation performed before photographing. The release operation is an operation for starting an exposure operation for still image photographing by driving a mechanical shutter or electronic shutter. The operation detection section 15 detects an operation performed on the operation section 25. Note that the camera 1 can select between a mechanical shutter mode and an electronic shutter mode. In the mechanical shutter mode, it is possible to control the exposure time by driving the shutter 14 during photographing exposure operation. In the electronic shutter mode, it is possible to control exposure time for photographing by a pseudo light shielding operation controlled by the image sensor 11. Further, the camera 1 can also select a wireless communication mode. In the wireless communication mode, the camera 1 is wirelessly communicably connected i.e. wirelessly connected to the earphone 3 which is an external reproduction device via the communication section 19, whereby it is possible to transmit audio data, the reproduction switching signal (predetermined data), referred to hereinafter, and the like to the earphone 3. Note that in a state in which the wireless communication mode is released, audio data is reproduced from the audio output section 17. Further, in a case where a wired earphone is connected to the camera 1, audio data is reproduced from the wired earphone.

The camera system controller 10 includes a CPU (central processing unit), and so forth, and controls the image sensor 11, the image processor 12, the memory 13, the shutter 14, the operation detection section 15, the image display section 16, the audio output section 17, the vibration detection section 18, the communication section 19, and the operation section 25. The camera system controller 10 also controls the interchangeable lens 2. The camera system controller 10 generates a timing signal used when image capturing is performed, and the like, and outputs the timing signal and the like to the components and the units. For example, in a case where an operation instruction is received by detection of full-pressing of the release button, the camera system controller 10 transmits command signals to the image sensor 11 and the lens system controller 20 to control them according to the received instruction.

The interchangeable lens 2 includes a photographing optical system 22, a lens driving unit 23, and the lens system controller 20. The photographing optical system 22 has at least one lens, through which light rays pass along an optical axis 21. The lens driving unit 23 adjusts the position of the lens of the photographing optical system 22. The lens system controller 20 controls the lens driving unit 23, a shake correction section (not shown) that performs shake correction, and so forth. Further, the camera 1 and the interchangeable lens 2 are electrically connected to each other via a lens contact 24. With this, data (signals) can be exchanged between the camera 1 and the interchangeable lens 2.

Figure 2:
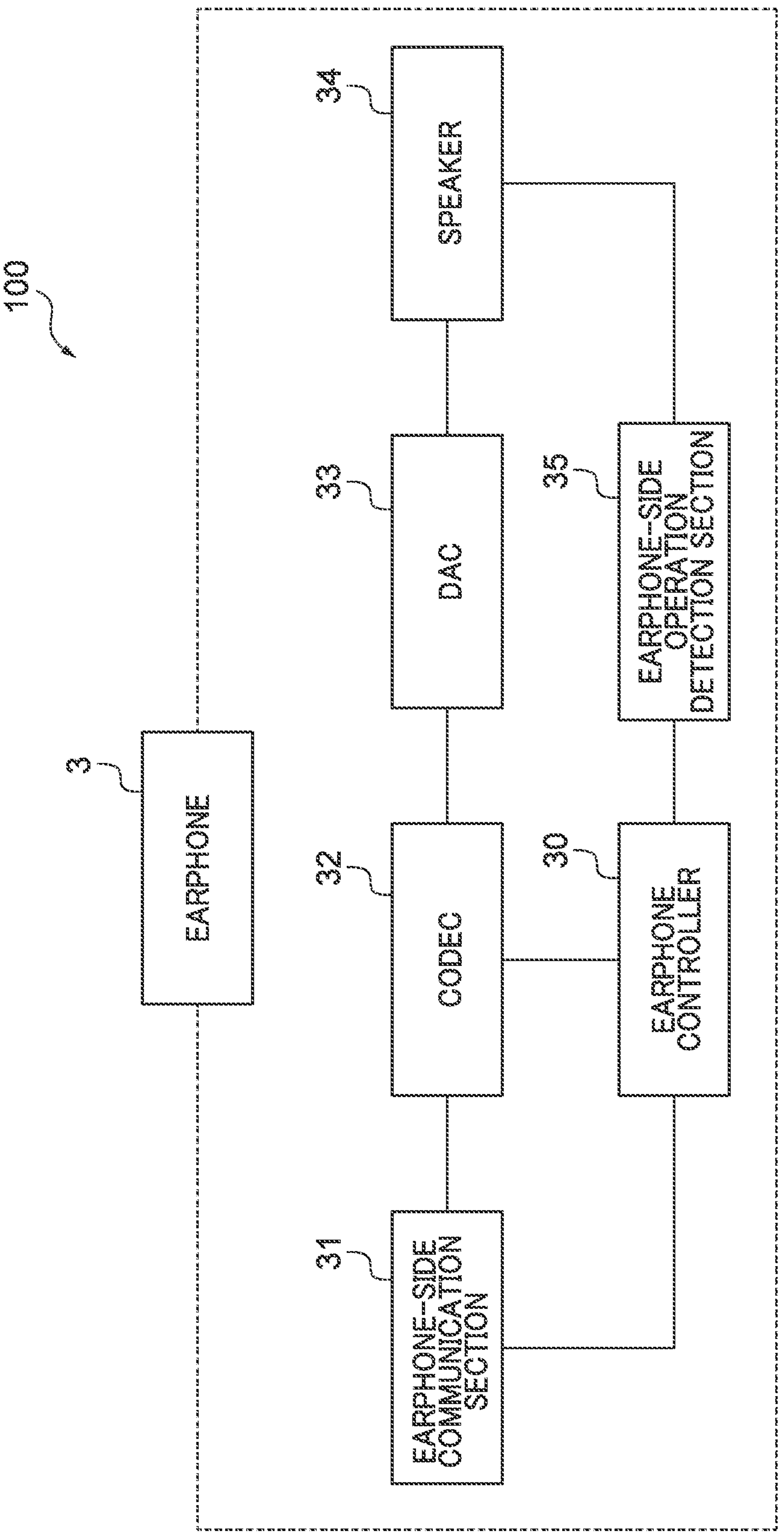
FIG. 2 is a block diagram of an earphone which can communicate with the camera in the first embodiment.
Figure 3:
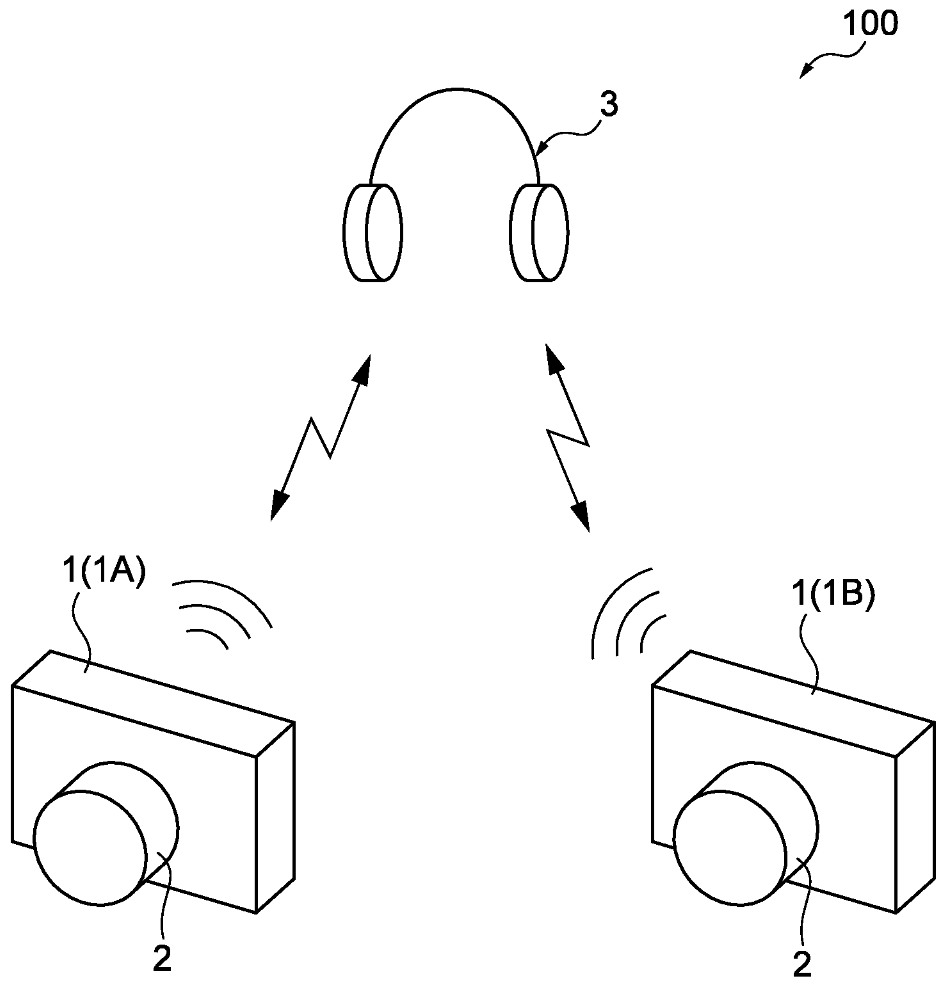
FIG. 3 is a view showing a communication state between the camera and the earphone in the first embodiment.

The earphone 3 shown in FIG. 2 is an external reproduction device which can be placed in a reproducible state in which audio data can be reproduced and a released state in which the reproducible state is released. As described hereinafter, the earphone 3 can maintain wireless connection to the two cameras 1, and is configured to automatically switch, when audio data is received from one of the cameras 1, audio data to be reproduced to the audio data received from the one camera 1. Further, in the reproducible state, the earphone 3 is in a state connected to one of the cameras 1 audio data received from which is to be reproduced. Further, in the released state, the earphone 3 is in a state connected to one of the cameras 1 audio data received from which is not to be reproduced. Although in the present embodiment, the earphone 3 is described as the external reproduction device, this is not limitative, but the external reproduction device may be a headphone. As shown in FIG. 2, the earphone 3 includes an earphone-side communication section 31, a codec 32, a DAC 33, a speaker 34, an earphone-side operation detection section 35, and an earphone controller 30. The earphone-side communication section 31 performs wireless communication with the camera 1 in the wireless communication mode. In the present embodiment, communication is performed using e.g. Bluetooth (registered trademark) as the wireless communication method. Further, in the present embodiment, the earphone 3 has a multi-paring function and a multi-point function. The "multi-paring function" is a function of holding a plurality of pairing information items. With this function, in a case where the earphone 3 performs pairing with the plurality of cameras 1, it is possible to omit an operation performed by a user for registering pairing information. The "multi-point function" is a function of simultaneously maintaining paired states (connected states) with the plurality of cameras 1. With this function, the earphone 3 can communicate with the plurality of cameras 1 in parallel. The earphone 3 is wirelessly connected to the plurality of cameras 1 by the multi-pairing function and the multi-point function, i.e. in a state having established pairing with the plurality of cameras 1. Therefore, the earphone 3 can receive data, such as audio data, from the cameras 1 in parallel. For example, in a case where after receiving and reproducing audio data from one of the cameras 1, the earphone 3 receives audio data from the other camera 1, the earphone 3 can automatically switch and reproduce this audio data. The user can reduce the time and effort for switching connection to the communication apparatus, by using the earphone 3 having the multi-point function. As shown in FIG. 3, in the communication system 100 of the present embodiment, the two cameras 1 are connected to the one earphone 3 in parallel. In the following description, in a case where the two cameras 1 are distinguished from each other, one of the cameras 1 is referred to as the "camera 1A", and the other is referred to as the "camera 1B, and in a case where the two cameras 1 are not distinguished, the cameras 1 are each simply referred to as the "camera 1". Further, although in the communication system 100 of the present embodiment, the two cameras 1 are connected to the earphone 3 in parallel, this is not limitative, but the three or more cameras 1 may be connected to the earphone 3 in parallel. Further, in the communication using Bluetooth, a plurality of communication profiles are available. In the present embodiment, as the communication profiles, a first communication profile in which audio data can be transmitted/received and a second communication profile in which the reproduction switching signal can be transmitted/received are available. The first communication profile and the second communication profile are transmitted from the communication section 19 of the camera 1 to the earphone-side communication section 31 of the earphone 3. In a case where Bluetooth is used, what is called "A2DP" is used for the first communication profile, and what is called "AVRCP" is used for the second communication profile. The codec 32 encodes and decodes audio data received by the earphone-side communication section 31. The DAC 33 performs DA (digital-to-analog) conversion. The speaker 34 reproduces audio data based on the output from the DAC 33. The earphone-side operation detection section 35 detects an operation, such as an operation of powering on/off the earphone 3. The earphone controller 30 controls the earphone-side communication section 31, the codec 32, the DAC 33, the speaker 34, and the earphone-side operation detection section 35.

Incidentally, the earphone 3 receives audio data from the camera 1A and the camera 1B via the earphone-side communication section 31 but has only one codec 32 and one DAC 33. For this reason, the audio data to be reproduced from the speaker 34 of the earphone 3 is audio data (an audio data item) received from one of the cameras 1A and 1B. So, in the earphone 3, it is necessary to switch which of the audio data items received from the camera 1A and the camera 1B is to be transmitted to the codec 32 and reproduced from the speaker 34. This switching is performed by the earphone-side communication section 31 under the control of the earphone controller 30. For example, let it be assumed that the earphone 3 receives audio data from the camera 1B, in a case where the earphone 3 is reproducing audio data received from the camera 1A or in a standby state in which audio data can be received from the camera 1A. In such an event, it is necessary to switch reproduction (such as buffering of audio data) such that the audio data received from the camera 1B is reproduced, but delay of reproduction of the audio data received from the camera 1B is caused due to this reproduction switching operation. The timing of reproduction switching is performed when audio data is received from the camera 1B. Further, as described above, the sound of audio data, i.e. the focus sound and the electronic shutter sound are used for enabling the user who uses the camera 1B to grasp the timing at which the camera 1B is enabled to perform photographing and grasp the timing at which the photographing is completed by the camera 1B. Therefore, depending on a degree of the delay of audio data, the user cannot accurately grasp the timing at which photographing is made executable and the photographing completion timing, and finds it difficult to perform photographing.

In view of this inconvenience, the communication system 100 (camera 1) aims to reduce the possibility of occurrence of the inconvenience. The following description will be given of the configuration and operation of the communication system 100.

Figure 4:
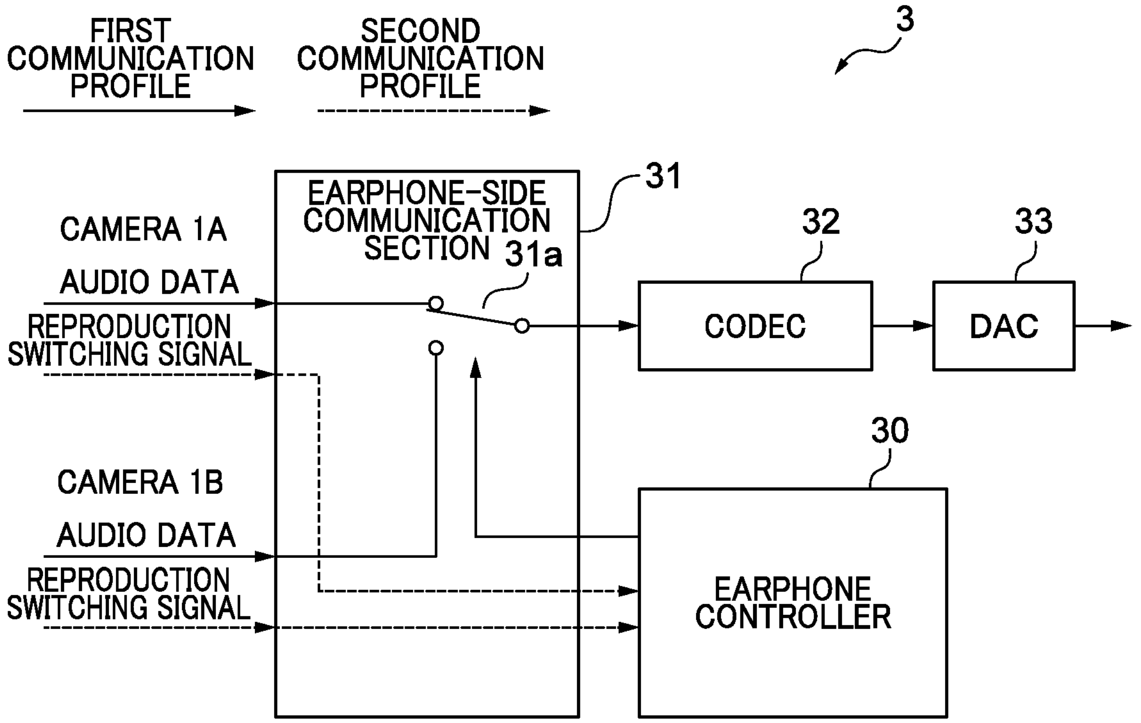
FIG. 4 is a block diagram showing the operation of the earphone in the first embodiment.

In the communication system 100, the camera 1A and the camera 1B, and the earphone 3 are paired, and communication between the camera 1A and the camera 1B, and the earphone 3 is established. Further, as shown in FIG. 4, from the camera 1A, the first communication profile including audio data is transmitted, and the second communication profile including the reproduction switching signal is transmitted, whereby the signals (data items) of the respective profiles are received by the earphone-side communication section 31. Similarly, also from the camera 1B, the first communication profile including audio data is transmitted, and the second communication profile including the reproduction switching signal is transmitted, whereby the signals (data items) of the respective profiles are received by the earphone-side communication section 31. In the present embodiment, the reproduction switching signal (predetermined data) is audio data outside the audible range (hereinafter also referred to as "dummy audio data"). The "dummy audio data" is audio data from which sound, which is outside the audible range and is not perceivable by a user even when reproduced, or silent sound having a small sound volume, is reproduce over a short time period, such as approximately several tens msec. In the following description, the audio data in the audible range and the dummy audio data are sometimes generically referred to as "audio data" if distinction therebetween is unnecessary. Further, the reproduction switching signal may be audio data which has zero sound volume (or very small sound volume) or audio data in which no data is stored (i.e. almost 0 byte). Further, the reproduction switching signal may be audio data in the audible range for reproducing sound for notifying a user that the device to reproduce the audio data has been switched over. Further, the signal of the second communication profile transmitted from each of the camera 1A and the camera 1B is received by the earphone controller 30 via the earphone-side communication section 31. Note that in FIG. 4, the audio data items of the first communication profile are each indicated by a solid line, and the reproduction switching signals of the second communication profile are each indicated by a broken line. In the following description, a state of the earphone 3 in which the audio data received from the camera 1A can be reproduced is referred to as the "reproducible state A", and a state in which the reproducible state A is released is referred to as the "released state A". Further, a state in which the audio data received from the camera 1B can be reproduced is referred to as the "reproducible state B", and a state in which the reproducible state B is released is referred to as the "released state B".

In the earphone 3 shown in FIG. 4, the reproduction switching signal from the camera 1A has been received by the earphone controller 30 and a reproduction switching section 31*a* has been switched to the camera 1A-side in advance, by way of example. As a result, the earphone 3 has been switched to the reproducible state A. i.e., the earphone 3 waits for reception of audio data from the camera 1A. On the other hand, the earphone 3 is in the released state B. Further, since the earphone 3 has already been switched to the reproducible state A, when audio data is received from the camera 1A, the earphone-side communication section 31 can transmit the received audio data to the codec 32 and the DAC 33 without delay. This makes it possible to immediately cause the audio data received the camera 1A to be reproduced from the speaker 34. On the other hand, when reproducing the audio data of the camera 1B, before transmitting the audio data, the reproduction switching signal for switching the earphone 3 to the reproducible state B is transmitted from the camera 1B to the earphone 3. This reproduction switching signal is received by the earphone controller 30. With this, the earphone 3 is switched to the reproducible state B. and on the other hand, the earphone 3 is switched to the released state A. Then, since the earphone section 3 has already been switched to the reproducible state B, when the audio data is received from the camera 1B, the earphone-side communication section 31 can transmit the received audio data to the codec 32 and the DAC 33 without delay. This makes it possible to immediately cause the audio data received from the camera 1B to be reproduced from the speaker 34. That is, it is possible to suppress delay of reproduction of the audio data from the camera 1B from the speaker 34.

Next, the timing of transmitting the reproduction switching signal will be described. In the present embodiment, the operation detection section 15 has a function of a state detection section (detection unit) 101 (see FIG. 1). The state detection section 101 can perform detection processing for detecting whether or not the camera 1 is in a state being used by a user (hereinafter referred to as the "in-use state"). As described above, the operation section 25 is the release button. The user causes the camera 1 to perform two operations which are different in type by operating the operation section 25. That is, the user can cause the camera 1 to perform the AF operation by the half-pressing operation and the release operation by the full-pressing operation. Then, upon receipt of the operation on the operation section 25, the operation detection section 15 which functions as the state detection section 101 detects the half-pressing operation (a state in which one of the above-mentioned two operations is being performed) as the in-use state. With this, it is possible to immediately detect the in-use state with simple configuration. Note that the operation detection section 15 may detect a full-pressing operation as the in-use state.

The communication section 19 can perform communication processing for transmitting the reproduction switching signal for switching the earphone 3 to the reproducible state to the earphone 3. In the communication processing, in a state in which the camera 1 is not being used by a user, when the in-use state is detected, i.e. a half-pressing operation is detected by the operation detection section 15 (state detection section 101), the reproduction switching signal is transmitted to the earphone 3 before transmitting audio data. The timing of this communication processing is the timing of transmitting the reproduction switching signal when reproducing audio data.

Figure 5:
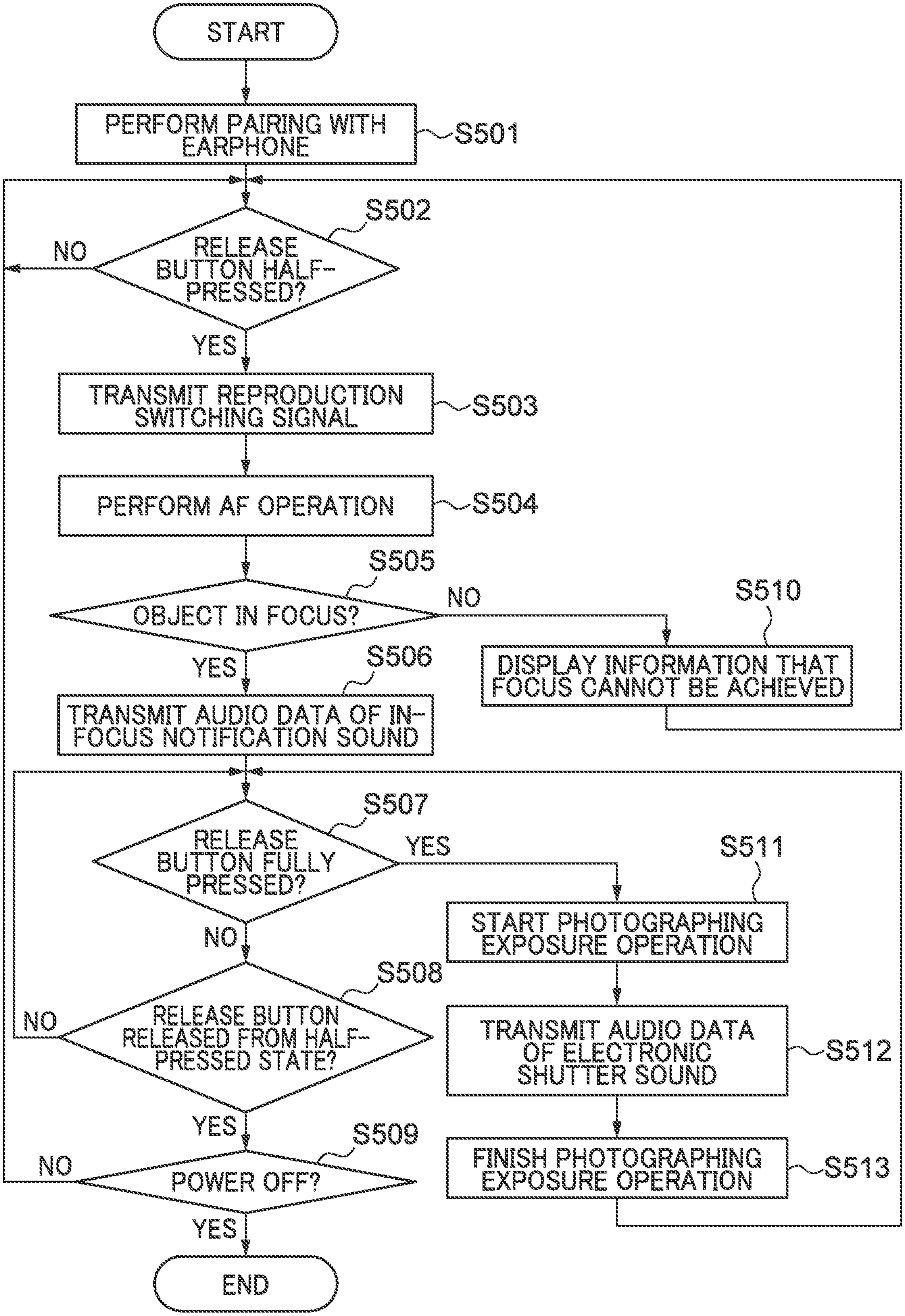
FIG. 5 is a flowchart of a photographing control process performed by the camera in the first embodiment.
Figure 6:
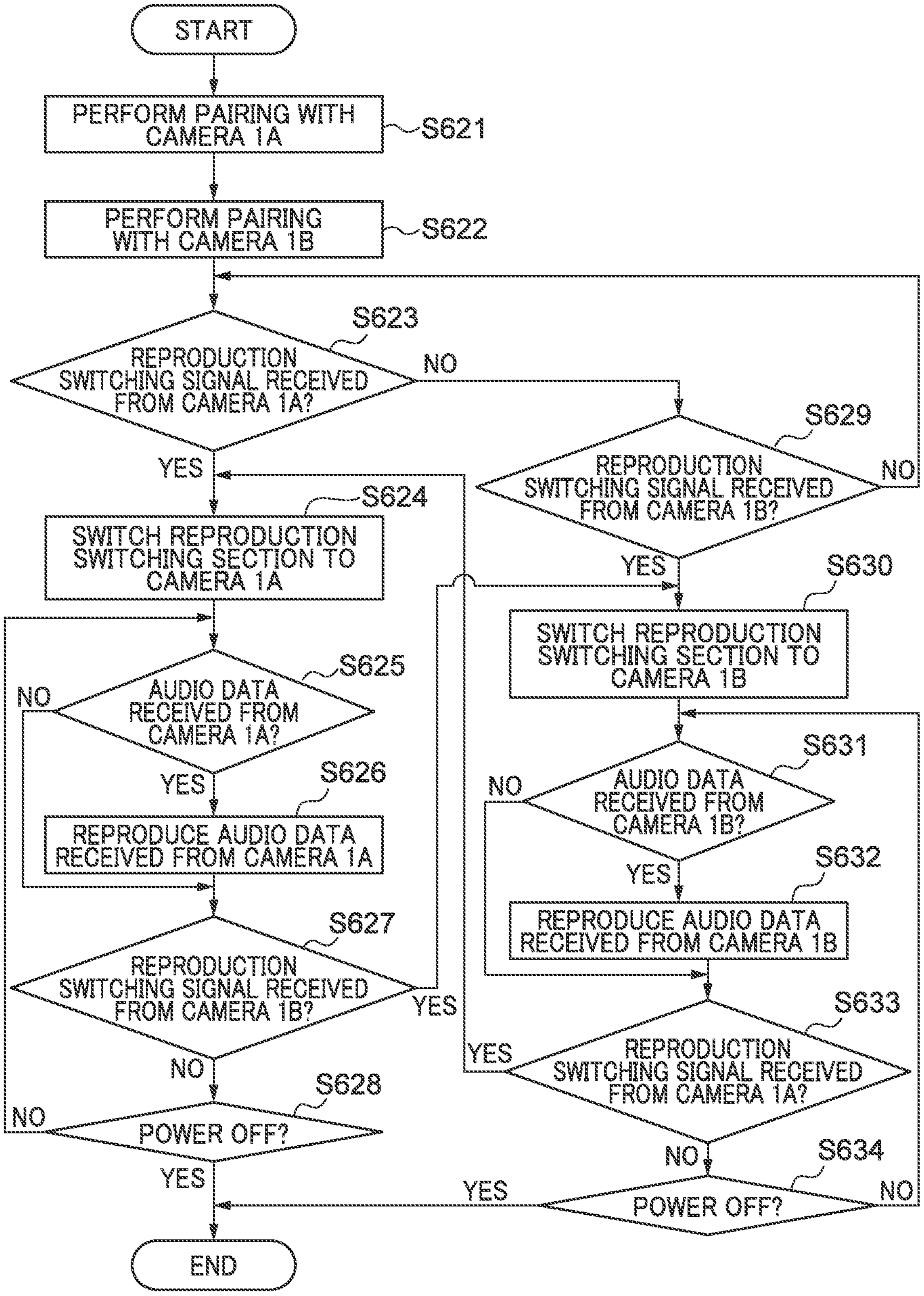
FIG. 6 is a flowchart of an audio reproduction control process performed by the earphone in the first embodiment.

Next, a control process performed in a case where wireless communication between the camera 1A and the camera 1B, and the earphone 3 is performed will be described. FIG. 5 is a flowchart of a photographing control process performed by the camera 1 (the camera 1A or the camera 1B), and FIG. 6 is a flowchart of an audio reproduction control process performed by the earphone 3.

The photographing control process in FIG. 5 is started when the camera 1 is so operated as to be connected to the earphone 3 by a user. In this camera 1, the present process is realized by the camera system controller 10 that loads software recorded in a nonvolatile memory, not shown, into a buffer memory, not shown, and executes the loaded software.

In a step S501, the camera system controller 10 of the camera 1 performs an operation of paring with the earphone 3 via the communication section 19. With this, wireless connection between the camera 1 and the earphone 3 is established, and then, the process proceeds to a step S502.

In the step S502, the operation detection section 15 (state detection section 101) determines whether or not the release button (operation section 25) has been half-pressed. If half-pressing of the release button (in-use state of the camera 1) has been detected by the operation detection section 15 in the step S502, the process proceeds to a step S503, whereas if half-pressing of the release button has not been detected, the process returns to the step S502, i.e. the operation detection section 15 remains on standby.

In the step S503, the camera system controller 10 transmits the reproduction switching signal to the earphone 3 via the communication section 19. With this, the earphone 3 is switched to a state in which audio data from the camera (self camera) wirelessly connected by the paring operation in the step S501 can be reproduced. That is, the earphone 3 is switched, in a case where another camera (the other camera) which has already been wirelessly connected exists, from a reproducible state in which audio data from the other camera can be reproduced to a reproducible state in which audio data from the self camera can be reproduced. Then, steps S504 and S505 are sequentially executed.

In the step S504, the camera system controller 10 causes the lens system controller 20 to operate the lens driving unit 23. With this, the AF operation is performed. In the step S505, the camera system controller 10 determines whether or not an object is in the in-focus state.

If it is determined by the camera system controller 10 in the step S505 that the object is in the in-focus state, the process proceeds to a step S506. On the other hand, if it is determined in the step S505 that the object is not in the in-focus state, i.e. the object cannot be brought into focus, the process proceeds to a step S510, and then returns to the step S502.

In the step S510, the camera system controller 10 displays information that the focus cannot be achieved, on the image display section 16. With this display, it is possible to prompt the user to half-press the release button again.

On the other hand, in the step S506 after execution of the step S505, the camera system controller 10 reads audio data of the focus sound from the memory 13 and transmits the audio data to the earphone 3 via the communication section 19. Then, the process proceeds to a step S507.

In the step S507, the operation detection section 15 determines whether or not the release button has been fully pressed. If full-pressing of the release button has been detected by the operation detection section 15 in the step S507, the process proceeds to a step S511, whereas if full-pressing of the release button has not been detected, the process proceeds to a step S508.

In the step S508, the operation detection section 15 determines whether or not the release button has been released from the half-pressed state. If it is determined by the operation detection section 15 in the step S508 that the release button has been released from the half-pressed state, the process proceeds to a step S509, whereas if the release button has not been released from the half-pressed state, the process returns to the step S507.

In the step S509, it is determined whether or not a power switch of the camera 1 has been turned off. This determination is performed by the operation detection section 15. If it is determined by the operation detection section 15 in the step S509 that the power switch has been turned off, the camera 1 is powered off, followed by terminating the present process, whereas if it is determined that the power switch has not been turned off, the process returns to the step S502.

In the step S511, the camera system controller 10 starts the photographing exposure operation including driving of the electronic shutter, exposure, charge accumulation, and photoelectric conversion, performed by the image sensor 11, and image generation performed by the image processor 12. Then, a step S512 and a step S513 are sequentially executed.

In the step S512, the camera system controller 10 reads out the audio data of the electronic shutter sound from the memory 13 and transmits the read audio data to the earphone 3 via the communication section 19.

In the step S513, the camera system controller 10 stores the image data photoelectrically converted by the image sensor in the memory 13 and terminates the photographing exposure operation. Then, after execution of the step S513, the process returns to the step S507.

Thus, the photographing control process is performed by the camera 1. Next, the audio reproduction control process performed by the earphone 3 will be described.

The audio reproduction control process in FIG. 6 is started when the earphone 3 receives a connection request from the camera 1. Although in the following description, a state in which wireless connection to the camera 1A and the camera 1B is established is realized by sequentially executing pairing in a step S621 and a step S622, the timing of establishing wireless connection to both cameras is not limited to this.

In the step S621, the earphone controller 30 of the earphone 3 performs the operation of pairing with the camera 1A via the earphone-side communication section 31. With this, wireless connection between the camera 1A and the earphone 3 is established. Further, in the step S622, the earphone controller 30 performs the operation of pairing with the camera 1B via the earphone-side communication section 31. With this, wireless connection between the camera 1B and the earphone 3 is established. Then, a step S623 is executed.

In the step S623, the earphone controller 30 determines whether or not the reproduction switching signal has been received from the camera 1A via the earphone-side communication section 31. If it is determined in the step S623 that the reproduction switching signal has been received from the camera 1A, the process proceeds to a step S624, whereas if it is determined that the reproduction switching signal has not been received, the process proceeds to a step S629.

In the step S624, the earphone controller 30 switches the reproduction switching section 31*a* to the camera 1A. With this, the earphone 3 is switched to the reproducible state A before receiving audio data from the camera 1A in the next step S625. Then, the step S625 is executed.

In the step S625, the earphone controller 30 determines whether or not the audio data has been received from the camera 1A via the earphone-side communication section 31. If it is determined by the earphone controller 30 in the step S625 that the audio data has been received from the camera 1A, the process proceeds to a step S626, whereas if it is determined that the audio data has not been received from the camera 1A, the process proceeds to a step S627.

In the step S626, the earphone controller 30 transmits the audio data received in the step S625 through the codec 32 and the DAC 33 in this order to reproduce the audio data from the speaker 34. Since the earphone 3 has already been switched to the reproducible state A as mentioned above, in the step S626, the earphone 3 can immediately reproduce the audio data received from the camera 1A without delay. Note that the audio data reproduced from the speaker 34 is the audio data of the focus sound or the audio data of the electronic shutter sound.

Further, in the step S627, the earphone controller 30 determines whether or not the reproduction switching signal has been received from the camera 1B via the earphone-side communication section 31. If it is determined by the earphone controller 30 in the step S627 that the reproduction switching signal has been received from the camera 1B, the process proceeds to a step S630, whereas if it is determined that the reproduction switching signal has not been received from the camera 1B, the process proceeds to a step S628.

In the step S628, the earphone-side operation detection section 35 determines whether or not a power switch, not shown, of the earphone 3 has been turned off. If it is determined by the earphone-side operation detection section 35 in the step S628 that the power switch has been turned off, the earphone 3 is powered off, followed by terminating the present process, whereas if it is determined that the power switch has not been turned off, the process returns to the step S625.

On the other hand, in the step S629 after execution of the step S623, the earphone controller 30 determines whether or not the reproduction switching signal has been received from the camera 1B via the earphone-side communication section 31. If it is determined by the earphone controller 30 in the step S629 that the reproduction switching signal has been received from the camera 1B, the process proceeds to the step S630, whereas if it is determined that the reproduction switching signal has not been received, the process returns to the step S623.

In the step S630, the earphone controller 30 switches the reproduction switching section 31*a* of the earphone-side communication section 31 to the camera 1B. With this, the earphone 3 is switched to the reproducible state B before receiving audio data from the camera 1B in the next step S631. Then, the process proceeds to the step S631.

In the step S631, the earphone controller 30 determines whether or not audio data has been received from the camera 1B via the earphone-side communication section 31. If it is determined by the earphone controller 30 in the step S631 that audio data has been received from the camera 1B, the process proceeds to a step S632, whereas if it is determined that audio data has not been received from the camera 1B, the process proceeds to a step S633.

In the step S632, the earphone controller 30 transmits the audio data received in the step S631 through the codec 32 and the DAC 33 in this order to reproduce the audio data from the speaker 34. Since the earphone 3 has already been switched to the reproducible state B as mentioned above, in the step S632, the earphone 3 can immediately reproduce the audio data received from the camera 1B without delay. Further, in the step S633, the earphone controller 30 determines whether or not the reproduction switching signal has been received from the camera 1A via the earphone-side communication section 31.

If it is determined by the earphone controller 30 in the step S633 that the reproduction switching signal has been received from the camera 1A, the process returns to the step S624, whereas if it is determined that the reproduction switching signal has not been received from the camera 1A, the process proceeds to a step S634.

In the step S634, the earphone-side operation detection section 35 determines whether or not the power switch of the earphone 3 has been turned off. If it is determined by the earphone-side operation detection section 35 in the step S634 that the power switch has been turned off, the earphone 3 is powered off, followed by terminating the present process, whereas if it is determined that the power switch has not been turned off, the process returns to the step S631.

Thus, the audio reproduction control process is performed by the earphone 3.

As described above, in the communication system 100, it is possible to immediately and easily perform switching of communication between the camera 1A and the camera 1B, and the earphone 3. More specifically, in the communication system 100, if the camera 1A is in the in-use state before audio data is transmitted from the camera 1A to the earphone 3, it is possible to switch the earphone 3 to the reproducible state A by transmitting the reproduction switching signal from the camera 1A to the earphone 3. With this, it is possible to reproduce the audio data transmitted from the camera 1A using the earphone 3 without delay. Similarly, if the camera 1B is in the in-use state before audio data is transmitted from the camera 1B to the earphone 3, it is possible to switch the earphone 3 to the reproducible state B by transmitting the reproduction switching signal from the camera 1B to the earphone 3. With this, it is possible to reproduce the audio data transmitted from the camera 1B using the earphone 3 without delay. Further, in the communication system 100, when one of the cameras 1 audio data received from which is desired to be reproduced is set to the in-use state, the operation for switching the earphone 3 to the camera 1 set to the in-use state (switching operation) is performed within the earphone 3, and hence it is possible to eliminate the time and effort for performing the switching operation anew. This improves the operability.

Although in the present embodiment, the half-pressing operation of the release button is detected by the state detection section 101, and the reproduction switching signal is transmitted to the earphone 3 via the communication section 19, this is not limitative. For example, the reproduction switching signal may be transmitted according to an operation other than the half-pressing operation of the release button. For example, transmission of the reproduction switching signal may be performed such that when a menu button for changing the setting of the photographing conditions of the camera 1 or a reproduction button is operated, the reproduction switching signal is not transmitted, but in a case where any other operation is performed, the reproduction switching signal is transmitted.

Further the camera 1 may be equipped with a contact detection section on a holding part (such as a camera body) gripped by the user for holding the camera 1. The contact detection section is not particularly limited, but for example, a contact sensor, a force sensor, or the like may be used therefor. Then, in a case where it is determined by the state detection section 101 that the contact detection sensor has detected a held state of the camera 1, the reproduction switching signal may be transmitted.

Further, the determination of switching from the in-use state to the not-in-use state of the camera 1 is performed in the following manner: If the operation section 25 has not been operated for a predetermined time period, or if the camera 1 is in a sleep state (power-off state), it is possible to determine that the camera 1 is in the not-in-use state. Further, it is possible to determine that the camera 1 is in the not-in-use state when the camera 1 receives a signal from the earphone 3, indicating that reproduction of audio data has been switched to the other camera.

As described above, although in the present embodiment, the state in which the operation section 25 is half-pressed is set as the in-use state by way of example, this is not limitative. For example, a state in which the operation section 25 is fully pressed, a state in which the camera 1 is held, a state in which the interchangeable lens 2 is operated, etc., can be set as the in-use state. On the other hand, as the state in which the camera 1 is not in the in-use state (in the not-in-use state), for example, a state in which the operation section 25 has not been operated for a predetermined time period or longer, a state in which the camera 1 is in a standby mode (in a power-off state), a state in which the camera 1 is placed on a desk or the like, and so forth can be set. Further, as the state in which the camera 1 is not in the in-use state, a state in which the camera 1 is hung from a user's neck using a strap or the like can be set.

Figure 7:
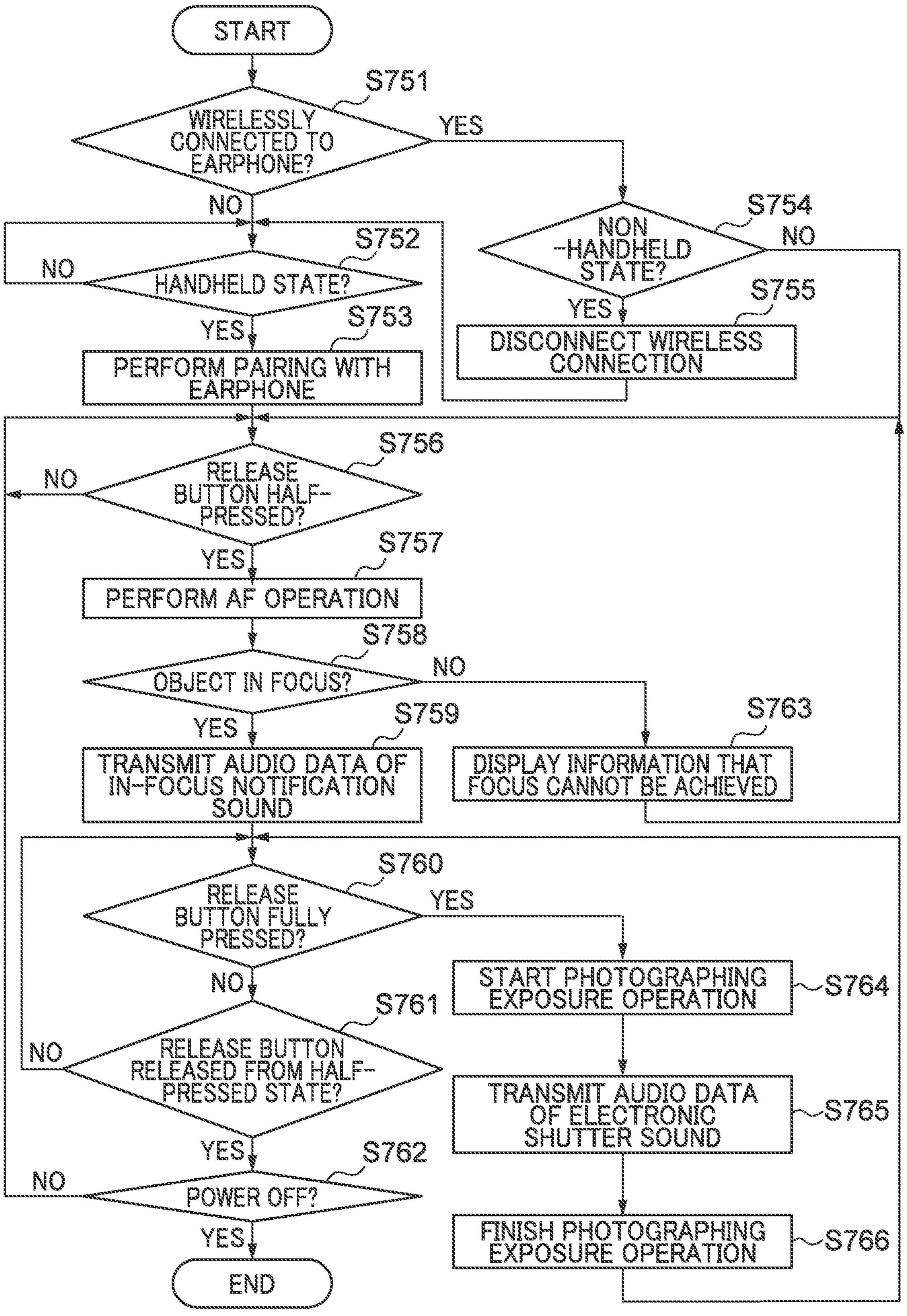
FIG. 7 is a flowchart of a photographing control process performed by the camera in a second embodiment.

A second embodiment will be described below with reference to FIG. 7. In the present embodiment, the vibration detection section 18 has the function of the state detection section 101. The vibration detection section 18 is configured to detect a vibration generated in the camera 1. For example, the camera 1 can detect a vibration of camera shake caused by a user holding the camera 1, using the vibration detection section 18. Further, the camera system controller 10 can perform part of the function of the state detection section 101 (vibration analyzing unit). In this case, the camera system controller 10 serves as determining means for determining whether or not the camera 1 is in a state held by a user (hereinafter referred to as the "handheld state"). i.e. in the in-use state, based on a result of the detection performed by the vibration detection section 18.

Further, in the present embodiment, it is assumed that the user has a plurality of cameras 1 each hung from his/her neck using e.g. a strap, and when performing photographing, the user selects one camera 1 out of the plurality of cameras 1 and performs photographing in a state holding the camera 1 by hand. In this case, the one camera 1 is in the handheld state in which the one camera 1 is held by the user, and the other camera 1 is in a non-handheld state in which the camera 1 is hung using the strap without being held. In the camera 1 in the handheld state, a vibration having a frequency of approximately 1 to 10 Hz, which is characteristic of a camera shake, tends to be generated, whereas in the camera 1 in the non-handheld state, a vibration having a frequency lower than that of the camera 1 in the handheld state tends to be generated. Thus, the frequency is different between the handheld state and the non-handheld state. From this fact, by analyzing the vibration generated in the camera 1, it is possible to determine whether the camera 1 is in the handheld state or in the non-handheld state based on a result of the analysis. Note that the vibration analysis (frequency analysis) on the camera 1 and the determination of whether or not the camera 1 is in the handheld state are performed by the camera system controller 10. If the camera 1 is in the handheld state, it is considered that there is a high possibility that the user performs photographing using this camera 1. In a case where it is determined that the camera 1 is in the handheld state, the reproduction switching signal is transmitted, whereby it is possible to reduce delay time before reproduction of audio data. Note that although in the present embodiment, the vibration analysis is performed by using the camera system controller 10, this is not limitative, but for example, the vibration analysis may be performed by using e.g. a signal processor (not shown) that is capable of performing calculation using an artificial intelligence specific to the vibration analysis. Further, the non-handheld state includes not only the state in which the camera 1 is hung using a strap, but also a state in which the camera 1 is placed on a desk or the like.

Further, the camera 1 can also be applied to a case where the earphone 3 of a single point type is used. Differently from the multi point type, the "single point type" is a system in which the earphone can be paired only with one communication apparatus (the "camera 1" in the present embodiment). i.e. wireless connection can be established only to one communication apparatus. Conventionally, for example, in a case where a user has a plurality of communication apparatuses desired to wirelessly connect to the earphone 3, the user is required to once disconnect one communication apparatus being currently wirelessly connected, and then perform wireless connection again so as to pair the other communication apparatus with the earphone 3. Therefore, the wireless connection work is troublesome for the user. To cope with this, if it is determined by the camera system controller 10 (determination unit) that the camera 1 being wirelessly connected is in the non-handheld state, wireless connection to this camera 1 is once disconnected. On the other hand, if it is determined that the camera which is not being wirelessly connected is in the handheld state, the control for starting the pairing operation between this camera 1 and the earphone 3 is performed. With this, the user can omit the disconnection work for the camera 1 desired to disconnect and the connection work for the camera 1 desired to wirelessly connect, and therefore, it is possible to reduce troublesomeness of the wireless connection work.

Next, a photographing control process performed by the camera 1 in a case where the earphone 3 of the single point type is used will be described with reference to a flowchart in FIG. 7.

This photographing control process is started when the camera 1 is powered on. In this camera 1, the present photographing control process is realized by the camera system controller 10 that loads software recorded in the nonvolatile memory into the buffer memory, and executes the loaded software.

In a step S751, the camera system controller 10 of the camera 1 determines whether or not wireless connection has been established by pairing this camera 1 and the earphone 3, i.e. this camera 1 is wirelessly connected to the earphone 3. If it is determined by the camera system controller 10 in the step S751 that the camera 1 and the earphone 3 are wirelessly connected to each other, the process proceeds to a step S754, whereas if it is determined that the camera 1 and the earphone 3 are not wirelessly connected to each other, the process proceeds to a step S752.

In the step S752, the camera system controller 10 analyzes a result of the detection performed by the vibration detection section 18 and determines whether or not the camera 1 is in the handheld state. If it is determined in the step S752 that the camera 1 is in the handheld state, the process proceeds to a step S753, whereas if it is determined that the camera 1 is not in the handheld state, i.e. in the non-handheld state, the process returns to the step S752.

In the step S753, the camera system controller 10 transmits a request signal for starting pairing with the earphone 3 via the communication section 19. With this, pairing between the camera 1 and the earphone 3 is performed, and wireless connection between the camera 1 and the earphone 3 is established. In the present embodiment, this pairing request signal corresponds to the reproduction switching signal. With this, the earphone 3 is switched to the reproducible state in which audio data received from the camera 1 in the handheld state can be reproduced.

On the other hand, in the step S754 after execution of the step S751, the camera system controller 10 analyzes a result of the detection performed by the vibration detection section 18 and determines whether or not the camera 1 wirelessly connected to the earphone 3 is in the non-handheld state. If it is determined by the camera system controller 10 in the step S754 that the camera 1 is in the non-handheld state, the process proceeds to a step S755, whereas if it is determined that the camera 1 is in the handheld state, the process proceeds to a step S756.

In the step S755, the camera system controller 10 disconnects wireless connection to the earphone 3. The wireless connection is disconnected because it is determined in the step S754 that the camera 1 is in the non-handheld state, and hence photographing is not immediately performed with this camera 1. After execution of the step S755, the process returns to the step S752.

In the step S756, the operation detection section 15 determines whether or not the release button has been half-pressed. If half-pressing of the release button has been detected by the operation detection section 15 in the step S756, the process proceeds to a step S757, whereas if half-pressing of the release button has not been detected, the process returns to the step S756. That is, the operation detection section 15 remains on standby in the step S756.

The step S757 and steps S758 to S766 sequentially correspond to and are the same as the processing operations in the steps S504 to S513 in FIG. 5, respectively. Therefore, description of the steps S757 to S766 is omitted.

Thus, the photographing control process of the camera 1 is performed.

As described above, in the present embodiment, the camera system controller 10 (determination unit) can determine whether or not the camera 1 is in the handheld state, based on a result of detection performed by the vibration detection section 18. Then, if it is determined by the camera system controller 10 that the camera 1 is in the handheld state, the communication section 19 transmits the reproduction switching signal, i.e. a pairing request signal to the earphone 3. With this, even in a case where the earphone 3 which is not adapted to multi-point, i.e. the earphone 3 of the single-point type is used, it is possible to switch the earphone 3 to the reproducible state in which audio data received from the camera 1 in the handheld state can be reproduced. Therefore, if only audio data is received in the reproducible state, the earphone 3 can immediately reproduce the audio data without delay. Note that the earphone 3 may have the multi-pairing function.

Figure 8:
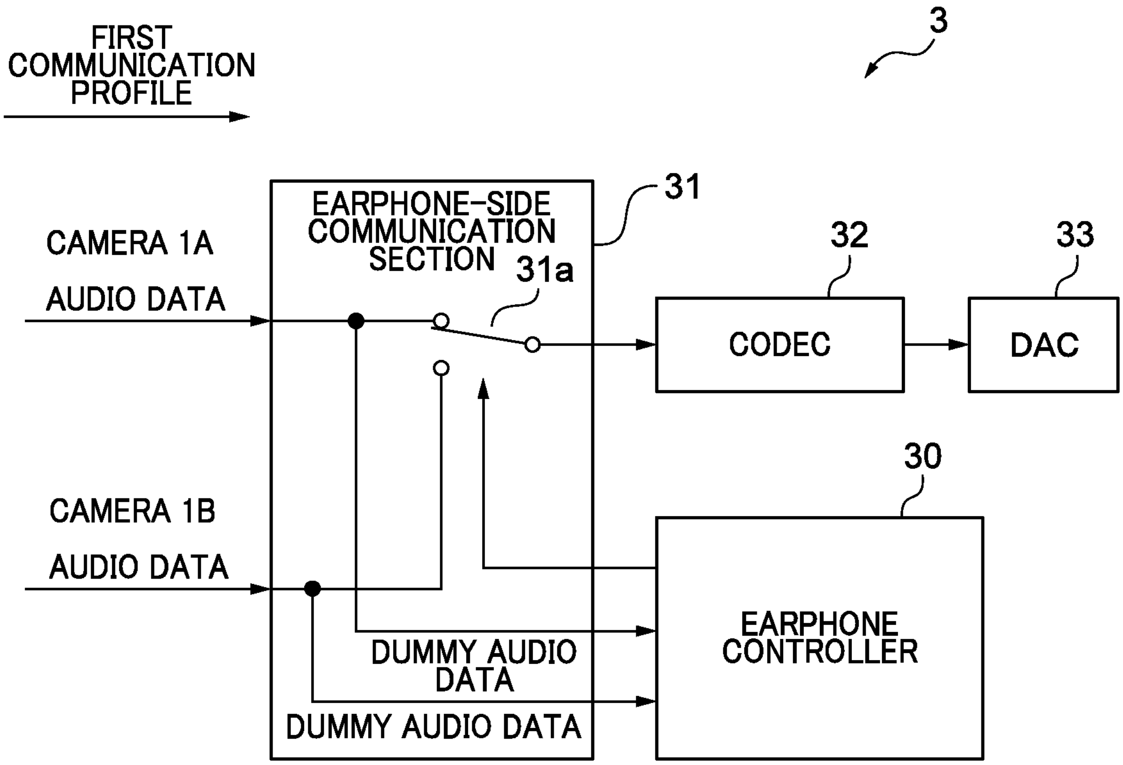
FIG. 8 is a block diagram showing the operation of the earphone in a third embodiment.

A third embodiment will be described below with reference to FIGS. 8 to 10. In the above-described first embodiment, communication between the two cameras 1 and the earphone 3 is performed using the two communication profiles, i.e. the first communication profile including the audio data and the second communication profile including the reproduction switching signal. In the present embodiment, a case where communication between the two cameras 1 and the earphone 3 is performed using one same communication profile will be described. This "one communication profile" is the first communication profile in which the audio data and the reproduction switching signal can be transmitted/received. As described above, the audio data is audio data in the audible range. In the present embodiment, the reproduction switching signal (predetermined data) is audio data outside the audible range (hereinafter referred to as the "dummy audio data"). Therefore, the first communication profile contain two types of audio data. The "dummy audio data" is audio data from which sound, which is outside the audible range and is not perceivable by a user even when reproduced, or silent sound having a small sound volume, is reproduce over a short time period, such as approximately several tens msec. Further, in the present embodiment, the dummy audio data is stored in the memory 13 as part of the first communication profile. In the following description, the audio data in the audible range and the dummy audio data are sometimes generically referred to as the "audio data" if distinction therebetween is unnecessary. Further, the reproduction switching signal may be audio data which has zero sound volume (or very small sound volume) or audio data in which no data is stored (i.e. almost 0 byte). Further, the reproduction switching signal may be audio data in the audible range for reproducing sound for notifying a user that the device to reproduce the audio data has been switched over. Note that, similar to the first embodiment, the timing of transmitting audio data in the present embodiment is a timing at which the half-pressing operation of the release button is detected by the state detection section 101.

The earphone 3 having the multi-point function performs pairing with the camera 1A and the camera 1B via the earphone-side communication section 31 to thereby establish communication with the camera 1A and the camera 1B. As shown in FIG. 8, the audio data (audio data in the audible range and the dummy audio data) is transmitted from the camera 1A and the camera 1B using the first communication profile. The audio data is transmitted to the earphone-side communication section 31. Further, the dummy audio data of the audio data is transmitted to the earphone controller 30 via the earphone-side communication section 31. Upon receipt of the dummy audio data, the earphone controller 30 switches the reproduction switching section 31*a* of the earphone-side communication section 31 so as to reproduce the audio data in the audible range from the camera 1 having transmitted the dummy audio data. With this, the earphone 3 is switched to the reproducible state in which the audio data from the camera 1 having transmitted the dummy audio data can be reproduced. Therefore, since the earphone 3 has thus already been switched to the reproducible state, if only the audio data in the audible range is received, the earphone 3 can immediately reproduce the audio data without delay.

Next, operations performed in a case where wireless communication is performed between the camera 1A and the camera 1B, and the earphone 3 will be described. FIG. 9 is a flowchart of a photographing control process performed by the cameras 1 (the camera 1A and the camera 1B), and FIG. 10 is a flowchart of an audio reproduction control process performed by the earphone 3.

Figure 9:
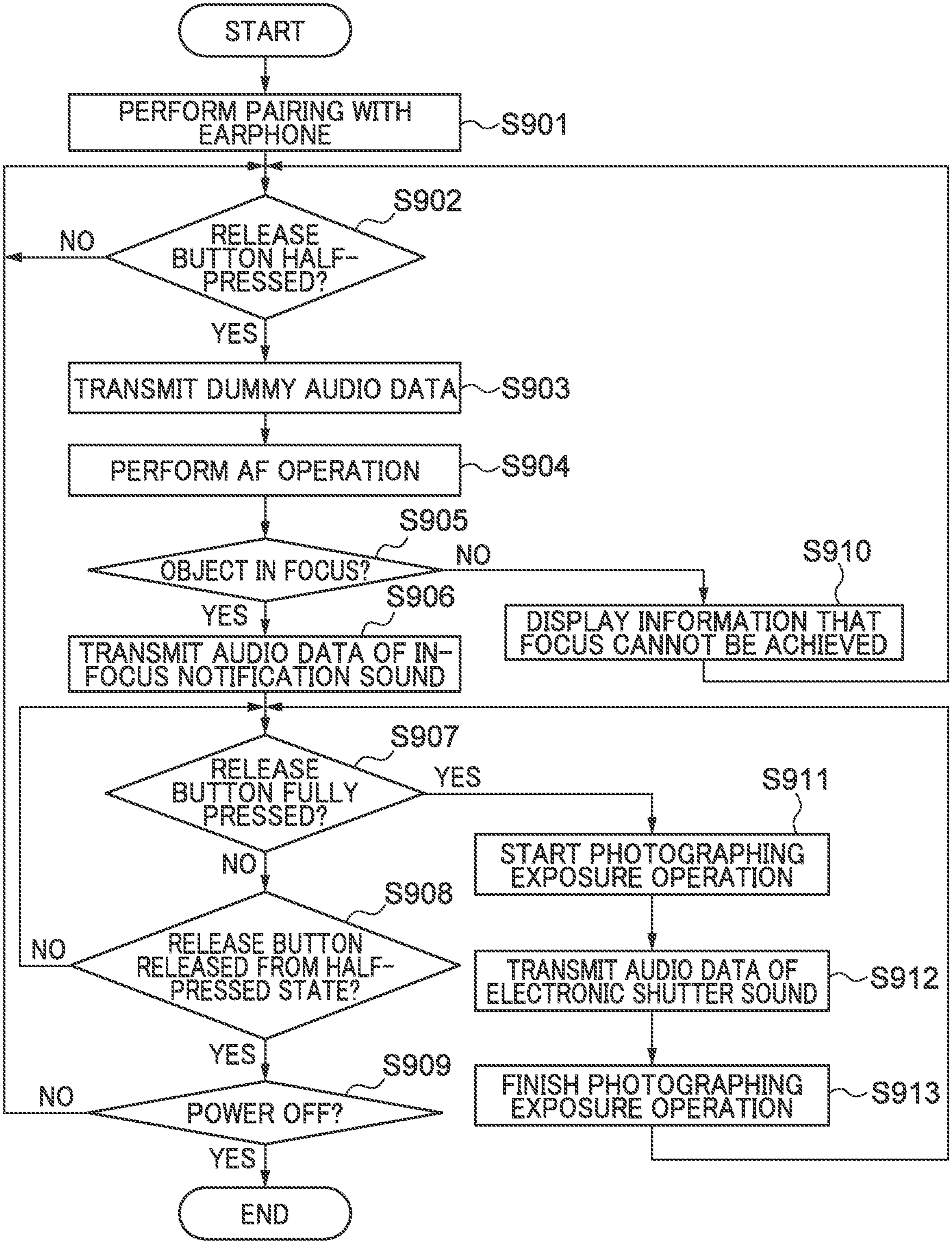
FIG. 9 is a flowchart of a photographing control process performed by the camera which can communicate with the earphone in the third embodiment.
Figure 10:
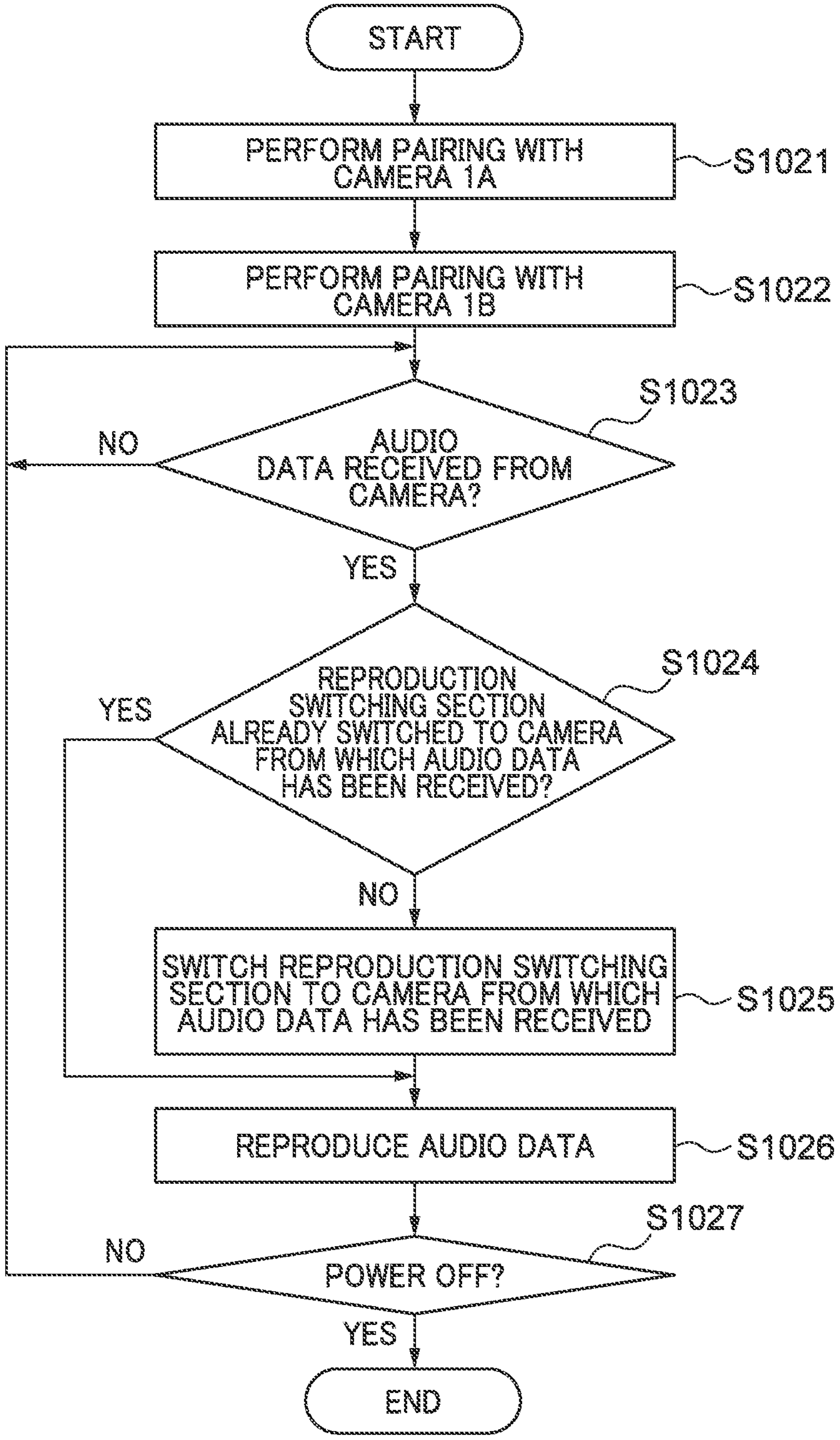
FIG. 10 is a flowchart of an audio reproduction control process performed by the earphone in the third embodiment.

The photographing control process in FIG. 9 is started when the camera 1 is operated by the user so as to be connected to the earphone 3. In this camera 1, the present process is realized by the camera system controller 10 that loads software recorded in the nonvolatile memory into the buffer memory, and executes the loaded software.

In a step S901, the camera system controller 10 of the camera 1 performs the operation of pairing with the earphone 3 via the communication section 19. With this, wireless connection between the camera 1 and the earphone 3 is established. Then, the process proceeds to a step S902.

In the step S902, the operation detection section 15 (state detection section 101) determines whether or not the release button has been half-pressed. If half-pressing of the release button has been detected by the operation detection section 15 in the step S902, the process proceeds to a step S903, whereas if half-pressing of the release button has not been detected, the process returns to the step S902, i.e. the operation detection section 15 remains on standby in the step S902.

In the step S903, the camera system controller 10 transmits dummy audio data as the reproduction switching signal to the earphone 3 via the communication section 19.

Steps S904 to S913 correspond to and are the same as the processing operations in the steps S504 to S513 in FIG. 5, and hence description of the steps S904 to S913 is omitted.

Thus, the photographing control process performed by the camera 1 has been described. Next, the audio reproduction control process performed by the earphone 3 will be described with reference to FIG. 10.

In the following description, a state in which wireless connection between the camera 1A and the camera 1B, and the earphone 3 has been established is realized by sequentially executing steps S1021 and S1022, but the timing of establishing wireless connection to both cameras is not limited to this.

In the step S1021, the earphone controller 30 of the earphone 3 performs the operation of pairing with the camera 1A via the earphone-side communication section 31. With this, wireless connection between the camera 1A and the earphone 3 is established. Further, in the step S1022, the earphone controller 30 performs the operation of pairing with the camera 1B via the earphone-side communication section 31. With this, wireless connection between the camera 1B and the earphone 3 is established. Then, the process proceeds to a step S1023.

In the step S1023, the earphone controller 30 determines whether audio data has been received from either the camera 1A or the camera 1B via the earphone-side communication section 31. In the step S1023, if the earphone controller 30 determines that the audio data has been received, the process proceeds to a step S1024, whereas if the earphone controller 30 does not determine that the audio data has been received, the process returns to the step S1023. That is, the earphone controller 30 remains on standby in the step S1023.

In the step S1024, the earphone controller 30 determines whether or not the reproduction switching section 31*a* of the earphone-side communication section 31 has been switched to the camera 1 (one of the camera 1A and the camera 1B) from which the audio data has been received as determined in the step S1023. If it is determined by the earphone controller 30 in the step S1024 that the reproduction switching section 31*a* has already been switched to the camera 1 from which the audio data has been received as determined in the step S1023, the process proceeds to a step S1026, whereas if not, the process proceeds to a step S1025.

In the step S1025, the earphone controller 30 switches the reproduction switching section 31*a* to the camera 1 from which the audio data has been received as determined in the step S1023.

In the step S1026, the earphone controller 30 transmits the audio data received in the step S1023 through the codec 32 and the DAC 33 in this order to reproduce the audio data from the speaker 34. Then, the process proceeds to a step S1027.

In the step S1027, the earphone-side operation detection section 35 determines whether or not the power switch of the earphone 3 has been turned off. If it is determined by the earphone-side operation detection section 35 in the step S1027 that the power switch has been turned off, the earphone 3 is powered off, followed by terminating the flow, whereas if it is determined that the power switch has not been turned off, the process returns to the step S1023.

Thus, the audio reproduction control process is performed by the earphone 3.

When the earphone 3 receives dummy audio data from the camera 1A in the step S1023 in a state in which the reproduction switching section 31*a* has been switched to the camera 1B, the earphone 3 switches the reproduction switching section 31*a* to the camera 1A. Then, although the dummy audio data is reproduced in the step S1026, since the dummy audio data is silent, this dummy audio data is not perceivable by the user. Further, in a case where the earphone 3 receives the audio data of the focus sound or the electronic shutter sound from the camera 1A in the step S1023, since the reproduction switching section 31*a* has already been switched to the camera 1A, it is possible to reduce delay caused when the audio data of the focus sound or the electronic shutter sound is reproduced. Thus, in the present embodiment, even when the earphone 3 is configured to switch the reproduction switching section 31*a* after receiving audio data, by transmitting the dummy audio data in advance, it is possible to reduce delay time before reproduction of the audio data in the audible range.

Note that although the dummy audio data is silent sound in the present embodiment, this is not limitative, but for example, the dummy audio data may be sound which is very low in sound pressure level and is not perceivable by a user. Further, the dummy audio data may be set to audio data of electronic sound different from the focus sound and the electronic shutter sound, and when the reproduction switching section 31*a* is switched over, this fact may be notified to a user by the dummy audio data.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-112304, filed Jul. 6, 2021, which is hereby incorporated by reference herein in its entirety.

What is claimed is:

1. A communication apparatus comprising:

a communication unit configured to perform wireless communication with an external reproduction device that is capable of automatically switching audio data transmitted from a plurality of communication apparatuses including the communication apparatus and reproducing the audio data; and a detection unit configured to detect whether or not the communication apparatus is used by a user, wherein the communication unit transmits, in a state having been not used by the user, in response to detection by the detection unit that the communication apparatus is used, predetermined data for switching the external reproduction device to a state for reproducing audio data transmitted from the communication apparatus, to the external reproduction device, before transmitting the audio data.

2. The communication apparatus according to claim 1, further comprising an operation unit configured to receive a user operation, wherein the detection unit detects that the communication apparatus is used by the user, according to reception of the user operation by the operation unit.

3. The communication apparatus according to claim 2, wherein the operation unit is a release button, and wherein the detection unit detects a half-pressing operation or a full-pressing operation performed on the release button.

4. The communication apparatus according to claim 3, wherein the audio data is transmitted when the full-pressing operation is performed, for notifying the full-pressing operation.

5. The communication apparatus according to claim 1, wherein the detection unit includes a determination unit configured to determine whether the communication apparatus is in a held state, as the in-use state in which the communication apparatus is used by the user, or not and wherein in a case where it is determined by the determination unit that the communication apparatus is in the held state, the communication unit transmits the predetermined data.

6. The communication apparatus according to claim 5, wherein the detection unit includes a vibration detection unit configured to detect a vibration generated in the communication apparatus, and wherein the determination unit determines whether or not the communication apparatus is in the held state, based on a result of the detection by the vibration detection unit.

7. The communication apparatus according to claim 6, wherein the vibration is a vibration generated by a shake caused by a user holding the communication apparatus.

8. The communication apparatus according to claim 1, wherein the communication unit transmits the audio data using a first communication profile and transmits the predetermined data using a second communication profile different from the first communication profile.

9. The communication apparatus according to claim 1, wherein the audio data is audio data in an audible range, and the predetermined data is audio data outside the audible range, and wherein the communication unit transmits the audio data and the predetermined data using the same communication profile.

10. The communication apparatus according to claim 1, wherein the predetermined data is smaller in sound volume than the audio data.

11. The communication apparatus according to claim 1, wherein the communication apparatus is an image capturing apparatus that is capable of photographing an image.

12. The communication apparatus according to claim 1, wherein the external reproduction device is an earphone or a headphone.

13. A method of controlling a communication apparatus, comprising:

performing wireless communication with an external reproduction device that is capable of automatically switching audio data transmitted from a plurality of communication apparatuses including the communication apparatus and reproducing the audio data;

detecting whether or not the communication apparatus is used by a user; and transmitting, in a state having been not used by the user, in response to detection by said detecting that the communication apparatus is used, predetermined data for switching the external reproduction device to a state for reproducing audio data transmitted from the communication apparatus, to the external reproduction device, before transmitting the audio data.

14. A non-transitory computer-readable storage medium storing a program for causing a computer to execute a method of controlling a communication apparatus, wherein the method comprises:

performing wireless communication with an external reproduction device that is capable of automatically switching audio data transmitted from a plurality of communication apparatuses including the communication apparatus and reproducing the audio data;

detecting whether or not the communication apparatus is used by a user; and transmitting, in a state having been not used by the user, in response to detection by said detecting that the communication apparatus is used, predetermined data for switching the external reproduction device to a state for reproducing audio data transmitted from the communication apparatus, to the external reproduction device, before transmitting the audio data.

* * * * *